(12) United States Patent
Lev et al.

(10) Patent No.: US 7,363,438 B1
(45) Date of Patent: Apr. 22, 2008

(54) EXTENDABLE MEMORY WORK-STEALING

(75) Inventors: Yosef Lev, Cambridge, MA (US); Nir N. Shavit, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 381 days.

(21) Appl. No.: 10/983,032

(22) Filed: Nov. 5, 2004

(51) Int. Cl.
*G06F 12/00* (2006.01)
*G06F 13/00* (2006.01)
*G06F 13/28* (2006.01)
*G06F 17/30* (2006.01)
*G06F 9/46* (2006.01)

(52) U.S. Cl. ............. 711/153; 707/205; 707/206; 718/100; 718/102; 718/104; 718/105; 711/170

(58) Field of Classification Search ............. 711/153
See application file for complete search history.

(56) References Cited

U.S. PATENT DOCUMENTS

| | | | | |
|---|---|---|---|---|
| 6,560,619 | B1* | 5/2003 | Flood et al. | 707/206 |
| 6,823,351 | B1* | 11/2004 | Flood et al. | 707/206 |
| 2001/0056420 | A1* | 12/2001 | Steele et al. | 707/8 |
| 2003/0005025 | A1* | 1/2003 | Shavit et al. | 709/102 |
| 2004/0015510 | A1* | 1/2004 | Moir et al. | 707/101 |
| 2004/0088702 | A1* | 5/2004 | Garthwaite et al. | 718/100 |

OTHER PUBLICATIONS

"The Performance of Work Stealing in Multiprogrammed environments", Robert D. Blumofe and Dionisios Papadopoulos, Department of Computer Sciences, The University of Texas at Austin, May 28, 1998.*
Thread Scheduling for Multiprogrammed Multiprocessors Authors: Nimar S. Arora, Robert D. Blumofe and C. Greg Plaxton Department of Computer Science, University of Texas at Austin Copyright ACM 1998-989791-989-0/98/6 1998 (pp. 119-129).

* cited by examiner

Primary Examiner—Matthew Kim
Assistant Examiner—Michael Alsip
(74) Attorney, Agent, or Firm—Osha·Liang LLP

(57) ABSTRACT

A deque of a local process in a memory work-stealing implementation may use one or more data structures to perform work. If the local process attempts to add a new value to its deque's data structure when the data structure is full (i.e., an overflow condition occurs), the contents of the data structure are copied to a larger allocated data structure (e.g., an array of greater size than an original array). The entries in the original, smaller-sized data structure are copied to exact positions in the now-active, larger-sized data structure. By this technique, the local process is thus provided with space to add the new value.

19 Claims, 6 Drawing Sheets push D

EXTENDABLE MEMORY WORK-STEALING

BACKGROUND OF INVENTION

A modern computer system has at least a microprocessor and some form of memory. Generally, the processor processes retrieves data stored in the memory, processes/uses the retrieved data to obtain a result, and stores the result in the memory.

One type of computer system uses a single processor to perform the operations of the computer system. In such a single processor (or "uniprocessor") computer system, incoming memory requests to memory occur serially. However, as described below with reference to FIG. 1, in a computer system that uses multiple processors at least partly in order to increase data throughput, due to parallel processing (i.e., simultaneous processing by two or more processors), memory shared by multiple processors may receive multiple memory requests that overlap in both time and space.

FIG. 1 shows a typical multiprocessor system (100). In FIG. 1, multiple processors (102, 104) share a memory (106) formed of numerous individual memory locations. An important design consideration in shared memory multiprocessor systems involves balancing work loads among processors. When a particular processor finds that it lacks the resources to perform a particular thread of work, the processor may obtain necessary resources from a processor that has such resources available. Such a technique is known and referred to as a "work-stealing" technique.

In a typical work-stealing technique such as, for example, that described in "Thread Scheduling for Multiprogrammed Multiprocessors" by N. Arora et al., each process maintains its own pool of ready threads from which the process obtains work resources. If the pool of a particular process becomes empty (due to, for example, heavy work demand on the process), that process becomes a "thief" and steals a thread from the pool of a "victim" process chosen at random as discussed below with reference to FIG. 2.

As shown in FIG. 2, a pool of threads (200) for a process is maintained with a fixed-size double-ended memory queue (or deque (202)), which has a top index that indexes the top thread and a variable bottom index that indexes the deque location below the bottom thread. Further, the deque has an array pointer that points to an active array of the deque. In general, the typical work-stealing technique involves a collection of deque data structures as shown in FIG. 2, where a local process performs pushes and pops on the "bottom" end of its deque and a thief process perform a pop on the "top" end of a victim process's deque. A pop operation is also referred to as a "removal-type operation."

Further, those skilled in the art will recognize that for n processes and a total allocated memory size m, each deque may have up to a memory size of m/n. Accordingly, designers often have to implement costly mechanisms to manage deque overflow.

To obtain work, i.e., to obtain a thread, a process pops a ready thread from the bottom of its deque and commences executing that thread. The process continues to execute that thread until the thread either blocks or terminates, at which point the process returns to its deque to obtain another ready thread. During the course of executing a thread, if a new thread is created or a blocked thread is unblocked, the process pushes that thread onto the bottom of its deque. Alternatively, the process may preempt the thread it was executing, push that thread onto the bottom of its deque, and commence executing the newly available ready thread.

Those skilled in the art will recognize that as long as the deque of a process is non-empty, the process manipulates its deque in a last-in-first-out (LIFO) manner.

If a process finds that its deque is empty when the process attempts to obtain work by popping a thread off the bottom of its deque, the process becomes a thief. In this case, the thief process picks a victim at random and attempts to "steal" work, i.e., obtain a thread, by removing the thread at the top of the deque belonging to the victim process. If the deque of the victim process is empty, the thief process picks another victim process and tries to steal work again. The thief process repeatedly attempts to steal work until the thief process finds a victim process that has a deque that is non-empty, at which point, the thief process "reforms" (i.e., ceases to be a thief) and commences work on the stolen thread as discussed above. Those skilled in the art will recognize that because work-stealing takes place at the top of a victim process's deque, work-stealing operates in a first-in-first-out (FIFO) manner.

When a thief process and a victim process concurrently attempt to obtain the same thread from the victim process's deque, a synchronization operation must be invoked to ensure proper operation. This scenario is detected by examining the gap between the top and bottom indexes. If the indexes are "too close," a synchronization operation using known non-blocking primitives such as Compare&Swap or Load-Linked/Store-Conditional may be invoked.

Due to the fixed-size memory space dedicated to each process in a typical work-stealing technique, applications that use the work-stealing technique (e.g., garbage collection) implement specific blocking mechanisms to handle overflow situations. One approach used to lessen the frequency of overflow handling involves resetting top and bottom to index the beginning of the deque every time an empty deque condition is detected. However, although such a reset operation may lessen the amount of times overflow occurs, costly mechanisms to manage overflow are still needed for those times that overflow still occurs.

SUMMARY OF INVENTION

According to one aspect of one or more embodiments of the present invention, a computer system comprises: a plurality of integrated circuits capable of concurrently executing a first process and a second process; and memory having a deque local to the first process, (i) where the deque comprises a first data structure, (ii) where, if an operation to add a value to the first data structure results in an overflow condition, the computer system is configured to allocate and activate a second data structure for the deque and to which the contents of the first data structure are copied and the value is added, (iii) where the second data structure is larger than the first data structure, and (iv) where the computer system is further configured to allow the second process to obtain a value from an active one of the first data structure and the second data structure.

According to another aspect of one or more embodiments of the present invention, a method of performing computer system operations comprises: implementing in memory a deque local to a first process, the deque comprising a first data structure for storing data; invoking an operation to add a value to the first data structure; and if the invoking causes an overflow condition, (i) allocating a second data structure for the deque, where the second data structure is larger than the first data structure, (ii) copying contents of the first data structure to the second data structure, (iii) activating the second data structure for use by the first process, and (iv)

adding the value to the second data structure, where a second process is allowed to invoke a non-blocking operation to obtain a value from an active one of the first data structure and the second data structure.

According to another aspect of one or more embodiments of the present invention, a computer system comprises: a deque associated with a first process in a shared memory multiprocessor system, the deque comprising a first data structure to hold data; and instructions stored in memory to (i) if an operation invoked by the first process to add a value to one end of the first data structure results in an overflow condition, (ii) allocate a second data structure for the deque, where the second data structure is larger than the first data structure, (iii) copy contents of the first data structure to the second data structure, (iv) activate the second data structure for use by the first process, and (v) add the value to the second data structure, where a second process is allowed to obtain a value from an active one of the first data structure and the second data structure.

According to another aspect of one or more embodiments of the present invention, a computer system comprises: a plurality of integrated circuits; a memory accessible to the plurality of integrated circuits; and instructions in the memory to (i) implement in memory a deque local to a first process, the deque having a first data structure to hold data, (ii) invoke an operation to add a value to the first data structure, and (iii) if the operation causes an overflow condition, (a) allocate a second data structure for the deque, wherein the second data structure is larger than the first data structure, (b) copy the contents of the first data structure to the second data structure, (c) activate the second data structure for use by the first process, and (d) add the value to the second data structure, where a second process is allowed to invoke a non-blocking operation to obtain a value from an active one of the first data structure and the second data structure.

Other aspects and advantages of the invention will be apparent from the following description and the appended claims.

DETAILED DESCRIPTION

As described above, in a memory work-stealing implementation, a local process maintains its deque to which the local process has access via one end of the deque (e.g., the bottom of the deque). When another process (in this case, the "thief" process) attempts to "steal" resources from the local process (in this case, the "victim" process), the thief process accesses the victim process's deque via another end of the deque (e.g., the top of the deque). Thus, operations by the local process to add or remove entries to its deque may be referred to as PushBottom and PopBottom operations, respectively, and an operation by another process to remove an entry from the local process's deque may be referred to as a PopTop operation.

Embodiments of the present invention relate to a memory work-stealing technique. In one or more embodiments of the present invention, the deque of a local process in a memory work-stealing implementation may use one or more nodes of arrays to perform work. In such embodiments, if the local process attempts to add a new value to an array in its deque (via, for example, a PushBottom operation) when the array is full (i.e., an overflow condition occurs), the contents of the array are copied to a larger array (i.e., an array of greater size than the original array). The entries in the original, smaller-sized array are copied to exact positions in the now-active, larger-sized array. In other words, the value in the ith position of the original array is copied to the ith position of the larger-sized array. Further, top and bottom from the original array are copied to index the exact corresponding positions in the now-active array. By this technique, the local process is thus provided with space to add the new value.

Further, in one or more other embodiments of the present invention, a data structure other than an array may be used to store data for a deque. For example, in one or more embodiments of the present invention, a linked list may be used to store data for a deque.

Figure 1:
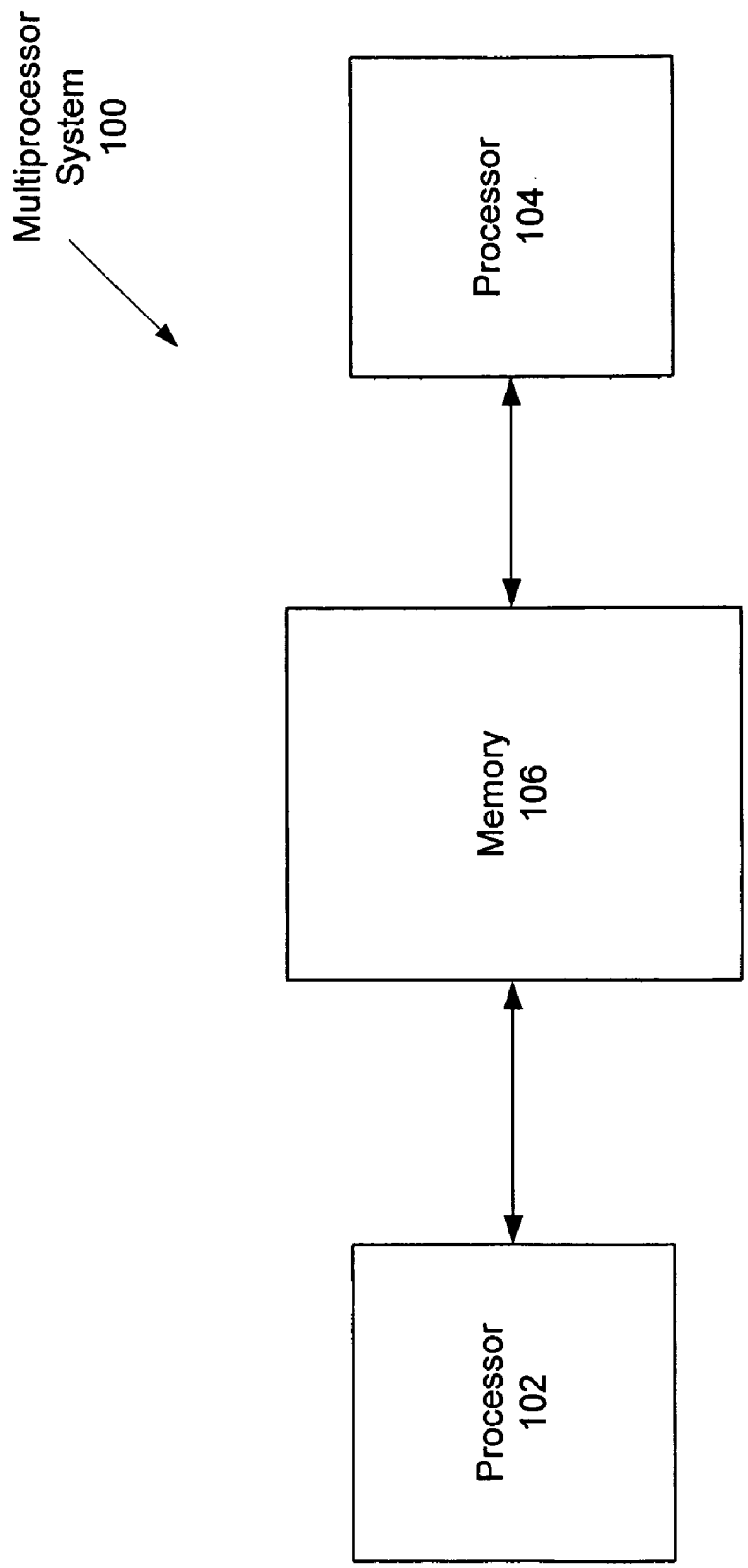
FIG. 1 shows a portion of a typical shared memory multiprocessor system.
Figure 2:
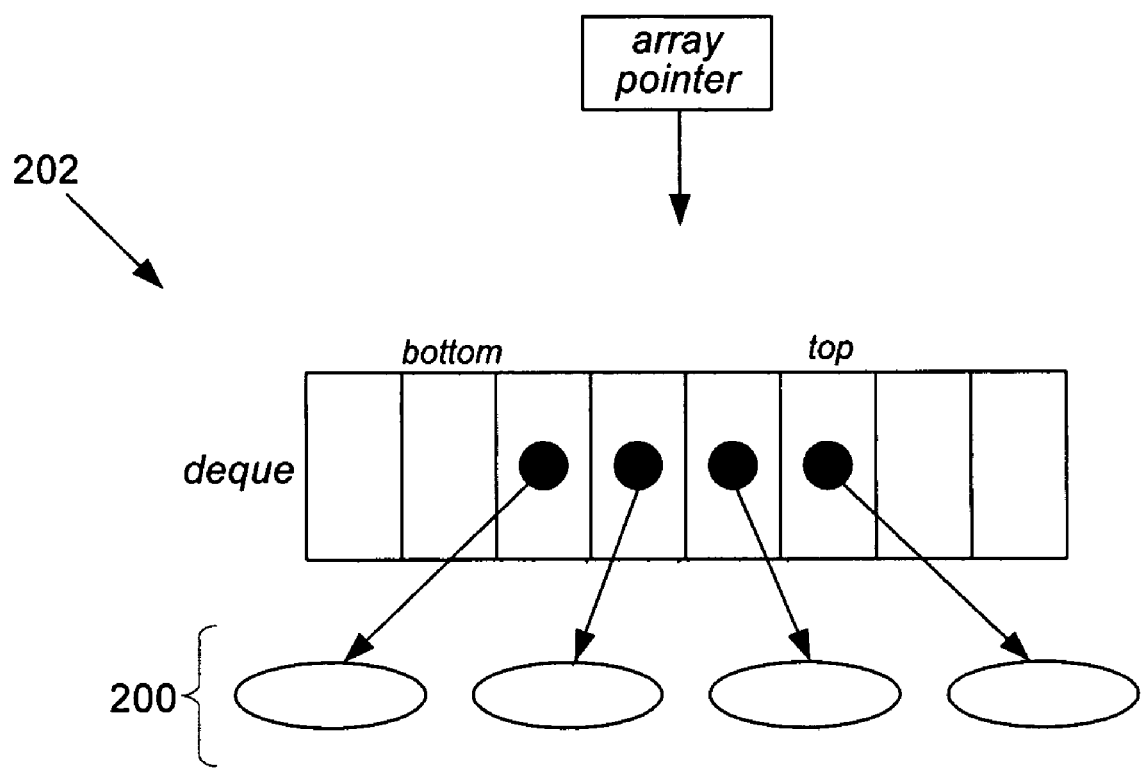
FIG. 2 shows a typical implementation of a deque.
Figure 3:
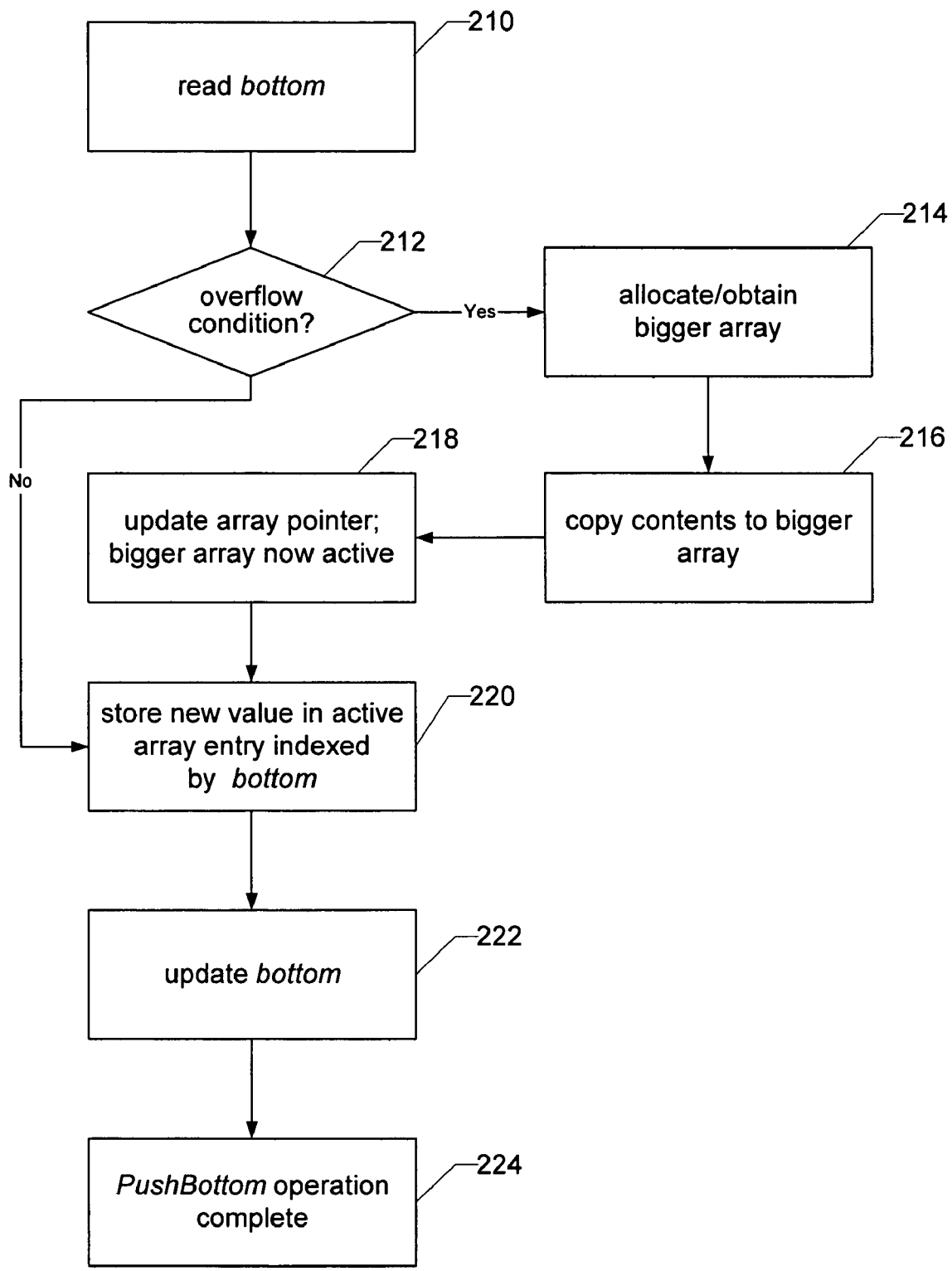
FIG. 3 shows a flow process of a PushBottom operation in accordance with an embodiment of the present invention.

FIG. 3 shows an exemplary flow process of a PushBottom operation in accordance with an embodiment of the present invention. When a PushBottom operation is invoked on an array in a process's deque, the value of bottom is read (ST210). If the read bottom position indicates an overflow condition due to the PushBottom operation's attempt to add a new value to the array (ST212), a bigger array is allocated/obtained (ST214). Thereafter, the contents of the current array are copied to the bigger array (ST216). After the bigger array is updated with the copy of the contents of the original array (ST216), in which case the array pointer is atomically updated to point to the bigger array (ST218), or if it was determined in ST212 that an overflow condition does not result, the value-to-be-added by the PushBottom operation is stored in the active array entry that is indexed by the bottom index (ST220). Then, bottom is updated (ST222), thereby completing the PushBottom operation (ST224).

Figure 4A:
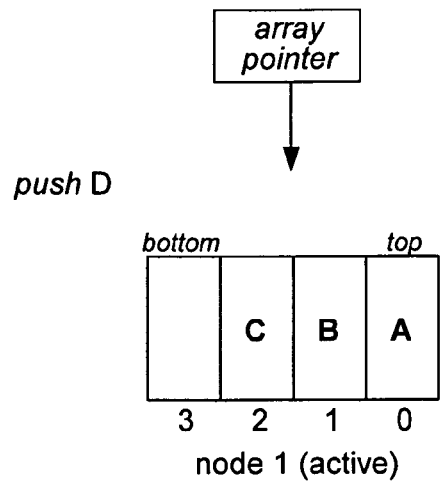
FIGS. 4A, 4B, and 4C show exemplary stages of a deque undergoing a PushBottom operation in accordance with an embodiment of the present invention.
Figure 4B:
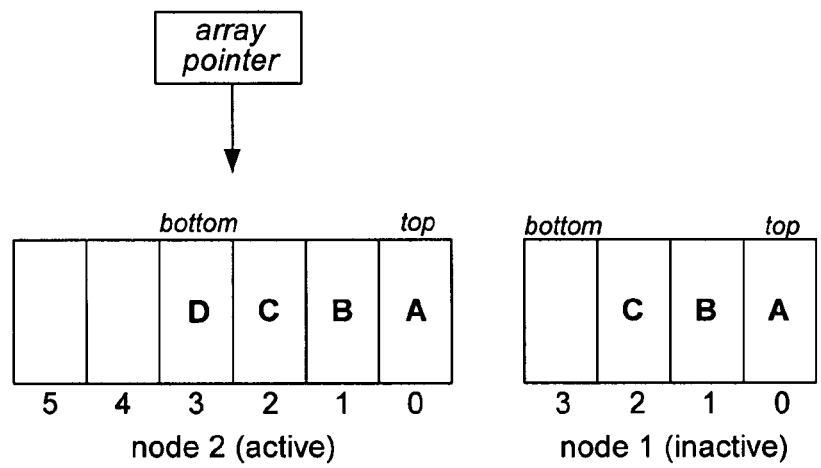
Figure 4C:
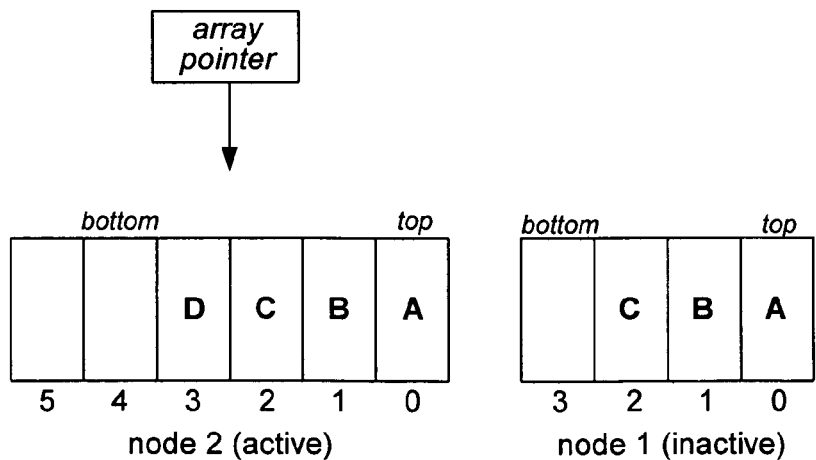

FIGS. 4A, 4B, and 4C show stages of an exemplary deque undergoing an exemplary PushBottom operation in accordance with an embodiment of the present invention. In FIG. 4A, top indexes node entry A in node 1 (a 4-entry node) and bottom indexes the node entry immediately below node entry C in node 1. When a PushBottom operation is invoked to push D onto the bottom of node 1, it is determined that the addition of D will cause an overflow condition. Thus, as shown in FIG. 4B, node 2 (a 6-entry node) is allocated/obtained and the contents of node 1 are directly copied into the corresponding positions in node 2. Top and bottom are also copied to index the exact positions in node 2 as they indexed in node 1. As node 2 is now the active array by changing the array pointer to point to node 2 instead of node 1, due to the availability of space to store D, (i) D is written to the node entry indexed by bottom in FIG. 4B and (ii) bottom is updated to its next position as shown in FIG. 4C.

In one or more embodiments of the present invention, a deque's bigger-sized array for handling overflow conditions may be dynamically allocated. However, in or more other embodiments of the present invention, a set of bigger-sized arrays may be pre-allocated and stored in a pool of such arrays, where the pool may be shared as needed among processes. In such embodiments of the present invention, if the shared pool of bigger-sized arrays is empty, a bigger-size array may be dynamically allocated by a process as needed.

Figure 5:
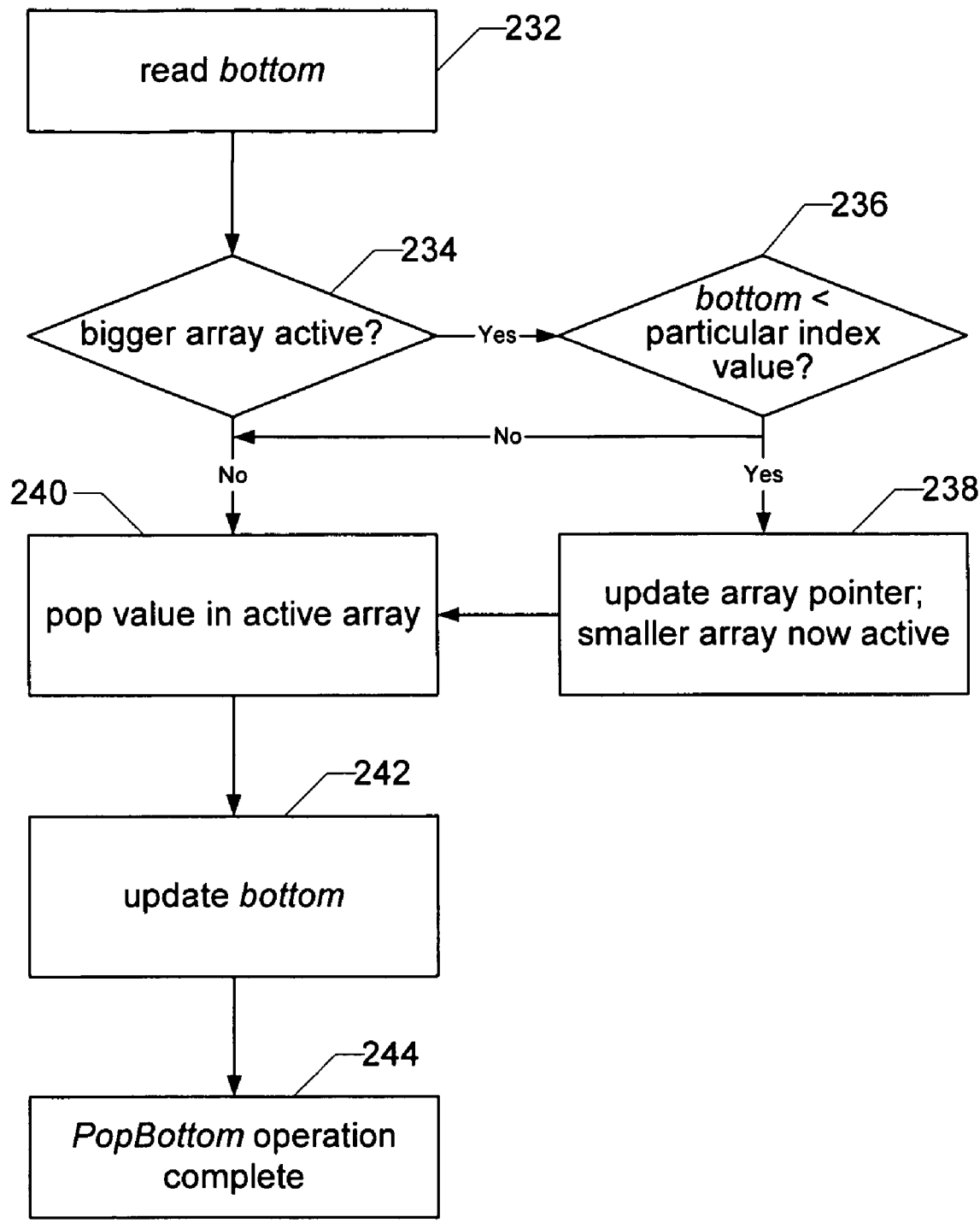
FIG. 5 shows a flow process of a PopBottom operation in accordance with an embodiment of the present invention.

In one or more other embodiments of the present invention, it may be desirable to release a bigger-sized array back into a shared pool when the contents of the bigger-sized array "shrink" back (due to, for example, PopBottom operations) to a size of a smaller-sized array from which the contents were originally copied into the bigger-sized array. For example, FIG. 5 shows an exemplary flow process of a PopBottom operation in accordance with an embodiment of the present invention. When a PopBottom operation is invoked, after bottom is read (ST232), it is determined whether a deque's bigger-sized array (i.e., an array into which contents of the deque's smaller-sized array were previously copied) is active (ST234). If the bigger-sized array is not active, then this indicates the smaller-sized array is active, and the value is popped from the active smaller-sized array (ST240). Thereafter, bottom is updated (ST242), thereby completing the PopBottom operation (ST244).

Alternatively, if the determination in ST234 yields that the bigger-sized array is active, a determination is made as to whether bottom is below a particular index value (ST236) (this particular index value being less than the original array size). If bottom is below the particular index value, this denotes that the local process may switch back to using the previously-used smaller-sized array. In other words, because bottom is only updated by the local process, and because bottom is only being decreased by the PopBottom operation, the PopBottom operation may be configured to detect when bottom is "low enough" to switch back to the previously-used smaller-sized array. Further, those skilled in the art will note that because bottom is updated only by the local process, and because entries are stored in the deque only in positions indexed by bottom, one may ensure that the entries stored in the deque below the particular index were not changed while the process was using the bigger-sized array, thereby eliminating the need for copying when switching back to the previously-used smaller-sized array.

Accordingly, if bottom in the bigger-sized array is less than to the particular index value (ST236), then the smaller-sized array is activated (ST238), after which, the value is popped from the smaller-sized array (ST240). Otherwise, if bottom in the bigger-sized array is not less than to the particular index value (ST236), then the bigger-sized array remains active and the value is popped from the bigger-sized array (ST240). Once the value is popped from either the bigger-sized array or the smaller-sized array, bottom is updated (ST242), thereby completing the PopBottom operation (ST244).

Figure 6A:
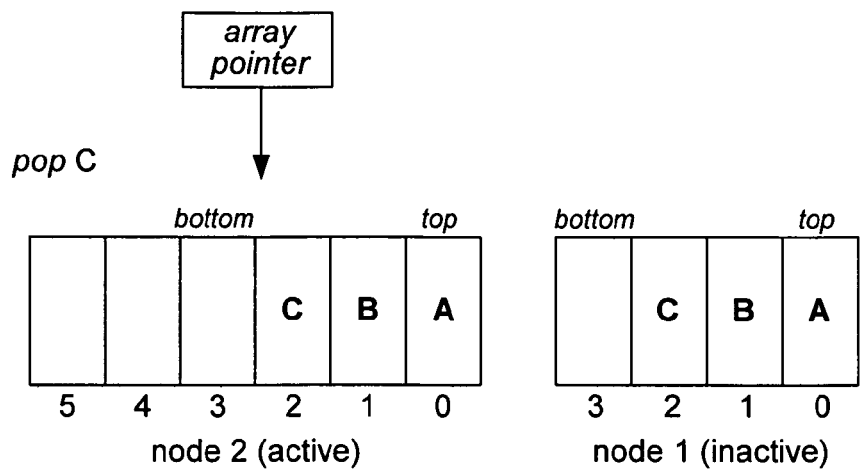
FIGS. 6A, 6B, and 6C show exemplary stages of a deque undergoing a PopBottom operation in accordance with an embodiment of the present invention.
Figure 6B:
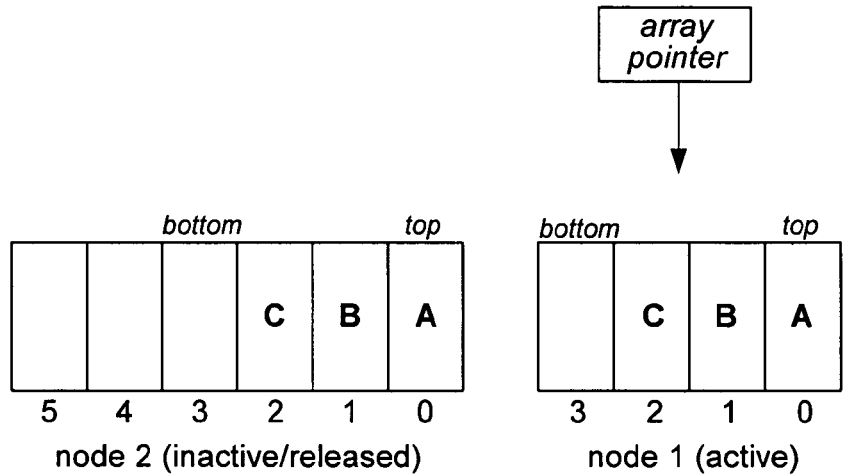
Figure 6C:
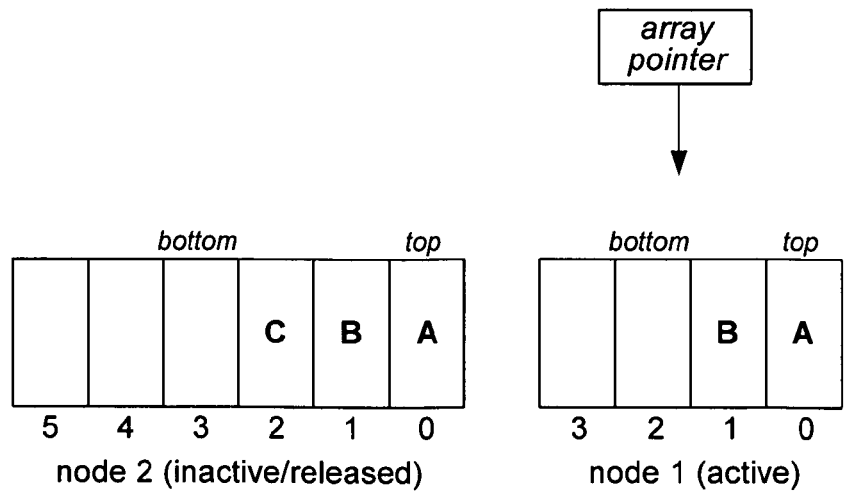

FIGS. 6A, 6B, and 6C show stages of an exemplary deque undergoing an exemplary PopBottom operation in accordance with an embodiment of the present invention. In FIG. 6A, top indexes node entry A in node 2 and bottom indexes the node entry immediately below node entry C in node 2. When a PopBottom is invoked to pop a value from the bottom of node 2, it is determined that bottom is lower than a particular index value, in this case, 4. Thus, in this case, node 1 is activated by changing the deque's array pointer to point to node 1 instead of node 2 as shown in FIG. 6B. Thereafter, entry C in node 1 is popped and bottom is updated as shown in FIG. 6C.

Those skilled in the art will note that in some cases, switching back to a bigger-sized array (after previously switching from a bigger-sized array to a smaller-sized array) may require copying the entire contents of the smaller-sized array. However, in one or more embodiments of the present invention, a PushBottom operation may detect that a newly allocated bigger-sized array is the same one it used the last time it overflowed. In this case, if the bigger-sized array has not been modified by another process, only the entries stored, i.e., pushed, after a particular index in the smaller-sized array are needed to be copied into the bigger-sized array. This may be achieved by using, for example, a minBottom value, which is defined as the lowest value of bottom since switching back to the smaller-sized array. Thus, when an overflow condition occurs, all entries stored below minBottom were not changed between the last and current copying, and therefore, do not need to be copied back into the bigger-sized array.

In one or more embodiments of the present invention, it may be possible to predict that an overflow condition will occur. If an overflow condition is predicted, the contents of a active smaller-sized array may be copied using a background process. In one or more other embodiments of the present invention, when a PushBottom operation detects than an array is x % full, it may invoke a background process to start copying the contents of a currently active smaller-sized array to a potentially active bigger-sized array. When the background process completes, an indication may be given that the copying is complete. In such embodiments, a local process may keep track of its minBottom after the background process began and until an overflow occurs so that when the overflow occurs, the local process may copy only those entries positioned after minBottom.

In one or more other embodiments of the present invention, a deque may be formed of structures other than a single array. For example, in one embodiment of the present invention, a deque may be formed of dynamically-linked arrays. In another embodiment of the present invention, a deque may be formed of dynamically-linked arrays.

Advantages of the present invention may include one or more of the following. In one or more embodiments of the present invention, a memory work-stealing technique uses one or more simple deque techniques, in which a new, bigger-sized deque is used if an overflow condition occurs.

In one or more embodiments of the present invention, in a memory work-stealing technique, because a process may dynamically switch between using a bigger-sized deque and smaller-sized deque, overflow conditions may be efficiently handled.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing threads, comprising:
   obtaining a first data structure local to a first process, wherein the first data structure stores a plurality of thread references and each of the plurality of thread references is assigned an index value in the first data structure;
   invoking a first push operation to add a first thread reference to the first data structure, wherein the first push operation triggers an overflow condition associated with the first data structure;
   activating a second data structure exceeding a size of the first data structure, wherein the second data structure is associated with an index value threshold;
   copying the plurality of thread references from the first data structure to the second data structure, wherein each of plurality of thread references in the second data structure has the same index value as the corresponding thread reference in the first data structure;
inactivating the first data structure after activating the second data structure;
adding the first thread reference to the second data structure;
invoking a first pop operation to remove the first thread reference from the second data structure, wherein the first pop operation satisfies the index value threshold and triggers initiating the re-activation of the first data structure;
re-activating the first data structure after invoking the first pop operation, wherein re-activating the first data structure inactivates the second data structure; and
executing a thread referenced by the first thread reference.

2. The method of claim 1, wherein at least one data structure selected from a group consisting of the first data structure and the second data structure is an array.

3. The method of claim 1, wherein at least one data structure selected from a group consisting of the first data structure and the second data structure is a linked-list.

4. The method of claim 1, wherein the second data structure is local to the first process.

5. The method of claim 1, wherein copying the plurality of thread references comprises:
maintaining an order of the plurality of thread references.

6. The method of claim 1, wherein activating the second data structure comprises switching a top pointer from referencing a top of the first data structure to referencing a top of the second data structure.

7. The method of claim 1, wherein activating the second data structure comprises switching a bottom pointer from referencing a bottom of the first data structure to referencing a bottom of the second data structure.

8. The method of claim 1, further comprising:
invoking a second pop operation on the first data structure.

9. The method of claim 1, wherein the first pop operation is performed on a bottom of the second data structure.

10. The method of claim 1, wherein the first data structure and the second data structure are associated with a deque local to the first process.

11. The method of claim 10, wherein activating the second data structure comprises switching an array pointer of the deque from referencing the first data structure to referencing the second data structure.

12. The method of claim 1, further comprising:
invoking a second push operation associated with the first data structure after activating the first data structure, wherein the second push operation triggers the overflow condition;
copying a third thread reference with an index value exceeding a minimum bottom value from the first data structure to the second data structure; and
activating the second data structure.

13. The method of claim 12, wherein the first push operation and the second push operation are performed on a bottom of the first data structure.

14. The method of claim 12, wherein a copy of a fourth thread reference stored in the first data structure having an index value less than the minimum bottom value is stored in the second data structure prior to copying the third thread reference.

15. The method of claim 12, further comprising:
invoking a second pop operation associated with first data structure prior to invoking the second push operation; and
decrementing the minimum bottom value after invoking the second pop operation.

16. The method of claim 1, further comprising:
invoking a second pop operation on a top of at least one data structure selected from a group consisting of the first data structure and the second data structure, wherein the second pop operation is invoked by a second process.

17. An apparatus for executing threads, comprising:
means for obtaining a first data structure local to a first process, wherein the first data structure stores a plurality of thread references and each of the plurality of thread references is assigned an index value in the first data structure;
means for invoking a first push operation to add a first thread reference to the first data structure, wherein the first push operation triggers an overflow condition associated with the first data structure;
means for activating a second data structure exceeding a size of the first data structure, wherein the second data structure is associated With an index value threshold;
means for copying the plurality of thread references from the first data structure to the second data structure, wherein each of plurality of thread references in the second data structure has the same index value as the corresponding thread reference in the first data structure;
means for inactivating the first data structure after activating the second data structure;
means for adding the first thread reference to the second data structure;
means for invoking a first pop operation to remove the first thread reference from the second data structure, wherein the first pop operation satisfies the index value threshold and triggers initiating the re-activation of the first data structure;
means for re-activating the first data structure after invoking the first pop operation, wherein re-activating the first data structure inactivates the second data structure; and
means executing a thread referenced by the first thread reference.

18. The apparatus of claim 17, further comprising:
means for invoking a second push operation associated with the first data structure after activating the first data structure, wherein the second push operation triggers the overflow condition;
means for copying a third thread reference with an index value exceeding a minimum bottom value from the first data structure to the second data structure; and
means for activating the second data structure.

19. The apparatus of claim 18, further comprising:
means for invoking a second pop operation associated with first data structure prior to invoking the second push operation; and
means for decrementing the minimum bottom value after invoking the second pop operation.

* * * * *